Feb. 24, 1970  A. F. WILD  3,497,027
ELECTRIC AUTOMOBILE
Filed Aug. 23, 1967  4 Sheets-Sheet 1

INVENTOR
ALBERT F. WILD

BY
ATTORNEY

Feb. 24, 1970     A. F. WILD     3,497,027
ELECTRIC AUTOMOBILE

Filed Aug. 23, 1967     4 Sheets-Sheet 2

INVENTOR
ALBERT F. WILD

BY *B. F. Schlesinger*
ATTORNEY

Feb. 24, 1970 A. F. WILD 3,497,027
ELECTRIC AUTOMOBILE
Filed Aug. 23, 1967 4 Sheets-Sheet 3
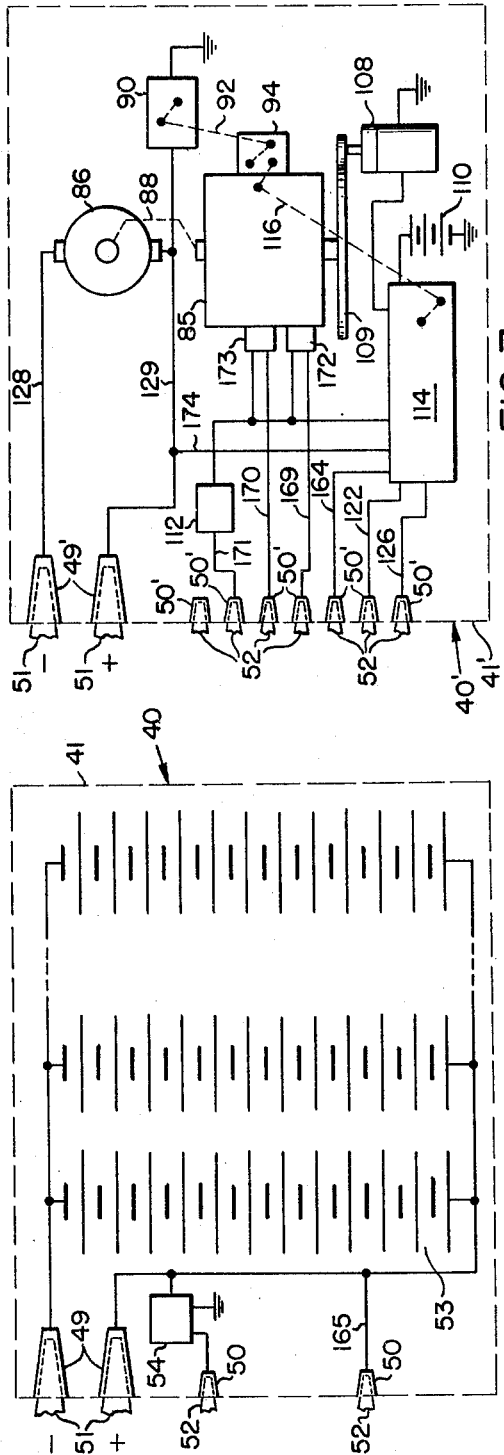
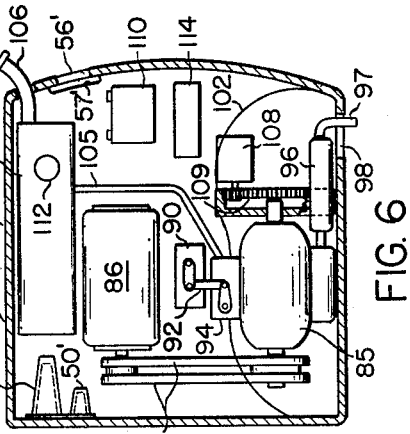
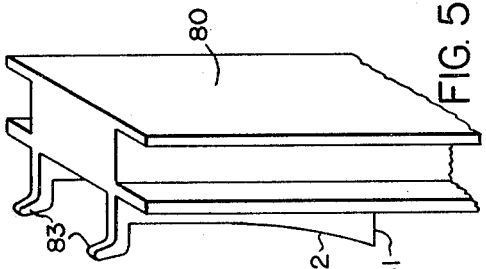
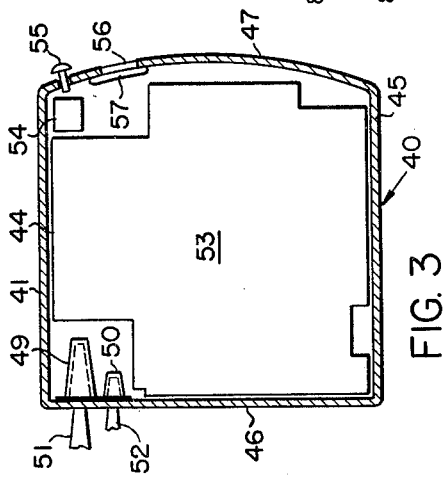
INVENTOR
ALBERT F. WILD
BY
ATTORNEY United States Patent Office 3,497,027
Patented Feb. 24, 1970

3,497,027
ELECTRIC AUTOMOBILE
Albert F. Wild, 107 Council Rock Ave.,
Rochester, N.Y. 14610
Filed Aug. 23, 1967, Ser. No. 662,780
Int. Cl. B60k 1/00; B62d 25/00
U.S. Cl. 180—65                    6 Claims

ABSTRACT OF THE DISCLOSURE

An automobile driven by electric motors, powered selectively from one of two different types of power pods, one containing batteries, and the other a generator that is powered by an internal combustion engine. The pods are interchangeable; and the battery-holding pod, at least, is removable so as to be recharged. A special tool is provided for moving a pod into and out of its compartment in the vehicle. Locking means operates releasably to secure the pod in place when the door of the compartment is closed. The vehicle may contain two pod compartments for housing both a battery and a generator type pod for use, for example, in the city and country, respectively.

---

This invention relates to automotive vehicles, and more particularly to electrically powered automotive vehicles. In a more specific aspect, the invention relates to novel power pods for powering such vehicles.

Electrically powered vehicles utilizing batteries to supply electric power have the advantages that they emit no noxious fumes or smog-creating gases and residue; they do not pollute the air; and they are cleaner and more silent in operation. The electric motors for driving electrically powered vehicles may be designed to have relatively small physical dimensions for a given horsepower, as compared to internal combustion engines. Further the drive mechanism for electrically powered vehicles need not be as complex and expensive as the corresponding drive mechanisms for internal combustion engine-powered vehicles. Clutches and means for change of gear ratio are unnecessary. Consequently, electrically-powered vehicles usually are cheaper to build and maintain. However, they have had heretofore two principal drawbacks. The batteries required for driving them are limited as to the horsepower they can generate, and as to the period they can be used without recharging. Therefore, such vehicles are suitable only for city driving where high speed is not desirable or legal, and where only relatively short distances are to be driven, and where it is possible to put up the car overnight while batteries are being recharged.

For urban use, high starting torque, great responsiveness at low speed, and a maximum speed limited to urban speed limits and to a safe speed for the weight of the vehicle in this use are desirable characteristics for a vehicle when it is being driven in a city. For use on the highways, that is, for nonurban use, however, high speed capability, smooth ride qualities and responsiveness at high speed are prime desirable characteristics. These two sets of characteristics are practically diametrically opposite, and for an electric drive to operate efficiently under both urban and non-urban conditions would require two different modes of operation. This would require two different power supply means for the two different driving conditions, a condition heretofore unachievable practically.

The primary object of this invention is to provide practical means for driving an electrically-powered automotive vehicle which will permit the vehicle to be driven over long distances without having to stop for recharging its batteries.

Another object of the invention is to provide an electrically powered automotive vehicle which is practical for use both for city and for country driving.

A further object of the invention is to provide an electrically-powered vehicle which can be powered by batteries but which need not be laid-up during recharging of its batteries.

Another object of the invention is to provide an electrically-powered vehicle on which two different output voltages can be supplied optionally. To this end, another object of the invention is to provide an electrically-operated vehicle which can be powered selectively by battery energy or by gasoline or like energy so that the advantages of battery power may be secured for city driving while the advantages of a long-range, widely available, relatively compact gasoline power are retained for distance driving.

A still further object of the invention is to provide an electrically-operated vehicle having power means of a standard construction which is removable and replaceable.

Still another object of the invention is to provide an electrically-operated vehicle which can be powered selectively by battery energy or by gasoline or like energy, and on which the two power sources can quickly and easily be coupled to and uncoupled from a common means for driving the wheels of the vehicle.

Other objects of the invention will be apparent hereinafter from the specification and from the recital of the appended claims, particularly when read in conjunction with the accompanying drawings.

In the drawings:

FIG. 3 is an enlarged, fragmentary vertical sectional view taken along the line 3—3 in FIG. 2, and further illustrating this one type of power pod;

FIG. 4 is an electrical schematic view, illustrating diagrammatically how this power pod is constructed and connected for use;

FIG. 5 is a fragmentary perspective view of one type of tool, which may be employed for transferring this power pod into and out of the vehicle;

FIG. 6 is a sectional view similar to FIG. 3, but illustrating the interior of a form of gasoline-actuated power pod, which may be used in this vehicle as a substitute for its battery-operated power pod of FIGS. 2 to 4;

FIG. 7 is an electrical schematic view, illustrating diagrammatically how this modified power pod is constructed and connected for use;

Figure 1:
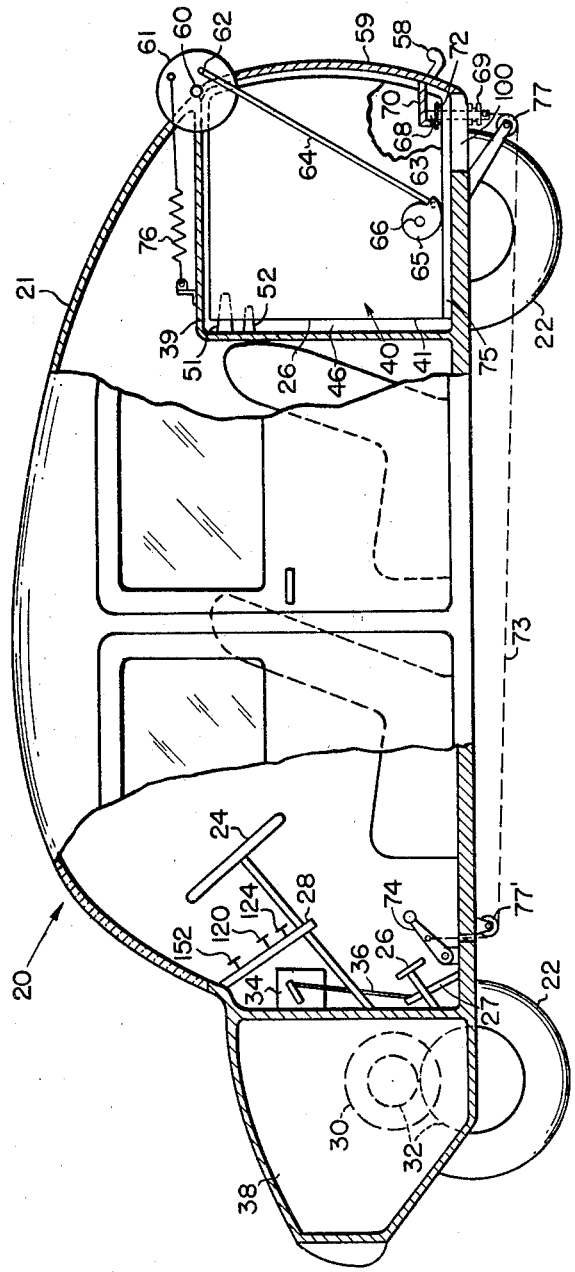
FIG. 1 is a schematic side elevational view of an automotive vehicle made in accordance with one embodiment of this invention, portions of the vehicle being broken away to illustrate more clearly the compartment in which the vehicle's power pod is housed; and one type of power pod which may be used to supply the electrical power for operating the vehicle.

Referring now to the drawings by numerals of reference, 20 denotes an automotive vehicle comprising a frame 21, which is supported on three or more wheels 22. The vehicle is adapted to employ standard steering and braking systems, including the usual steering wheel 24 (FIG. 1) and brake pedal 26. An accelerator 27 is mounted beneath a conventional dashboard 28 that carries the usual gauges or instruments, such as the speedometer, the headlight switch, etc.

Suitably located to utilize most efficiently otherwise unusable vehicle space is or are an electric drive motor or motors 30. Rotationally connected between the motor or motors 30 are power drive components such as conventional gearing 32, or other means which maintain a fixed rotational relationship between the motor or motors and one or more of the wheels 22. The motor or motors 30 is or are controlled by a conventional electric drive control 34, which provides for starting, stopping and varying the speed of the vehicle. Control 34 is operated by the accelerator 27, which is operatively connected to the control 34 by a mechanical linkage, part of which is denoted at 36. Provision for reversing the vehicle is in the form of a reversing switch 37 (FIG. 8), which is located in the control 34.

In its forward end vehicle 20 has a luggage compartment 38, and in its rear end a compartment 39 for removably housing a power pod 40 (FIGS. 1 to 4) or 40′ (FIGS. 6 and 7) that supplies electrical power to the motor, or motors 30.

Pod 40 comprises a housing 41 having spaced, parallel side walls 42 and 43 (FIG. 2), parallel upper and lower walls 44 and 45 (FIG. 3), respectively, a transverse front wall 46, and a curved rear wall 47. All of these housing walls preferably are constructed of materials resistant to deterioration or damage from leakage of battery fluids, or shifting of battery components, as resulting from a collision or an overturning of the vehicle, and may be sealed to contain all dangerous fluids or parts, in such event.

Mounted in the front wall 46 of housing 41 are two sets of female receptacles or sockets 49 and 50 (FIGS. 3 and 4 which are adapted to receive male jacks or terminals 51 and 52, respectively, that project rearwardly from the inside front wall of compartment 39. Housing 41 contains a battery 53, and a monitoring device 54. The battery comprises a number of conventional battery cells, which are connected to yield the voltage desired, preferably in the range of from 12 to 600 volts D.C. The monitor 54 measures, at all times, the charge remaining in the battery 53.

Adjacent its upper end, wall 47 has an opening containing a conventional vent 55. Vent 55 is so configured and located as to vent battery power pod 40 under normal conditions, and is so located that it will not provide a means of leakage of battery fluids in the event of an overturning if the vehicle comes to rest on its wheels, top, sides or front. In the event that the vehicle comes to rest on its rear, leakage of battery fluids is possible, but danger to occupants from leaking battery fluids is impossible with the vehicle in this attitude. Beneath the vent 55, wall 47 is provided with a pair of spaced, parallel, vertically extending slots 56 (FIG. 2), the inner ends of which are closed and sealed by a pair of spring-loaded cover plates 57 (FIG. 3) that are pivoted to the inside of wall 47 in conventional manner.

Pod 40 is held in the compartment 39 by a door 59 (FIGS. 1 and 2) which is secured along its upper edge to a hinge pin or shaft 60, which is rotatably journaled in the portion of frame 21 bordering the upper, open end of compartment 39. Door 59 has a handle 58 projecting therefrom adjacent its lower edge, for pivoting it about its hinge axis between closed position (FIG. 1) in which it seals compartment 39, and open position (FIG. 2) in which a pod 40 may be withdrawn from or inserted into compartment 39. Secured to opposite ends of the hinge pin 60 for pivotal movement therewith are two, spaced plates 61. Each plate 61 is pivotally connected by a pin 62 to the upper end of a link 64, the lower end of which is pivotally connected by a further pin 63 to a cam 65. The two cams 65 are mounted to rotate on studs 66, which are fixed in the frame 21 to project coaxially into opposite sides of the compartment 39.

Normally the door 59 is held closed by a latch 68 (FIG. 1), which is mounted in the bottom of compartment 39 for movement into and out of locking engagement with a dog 70, that projects from door 59 into a recess 71 in the lower edge of housing 41. Pin 68 projects beneath the bottom of compartment 39 and has an externally grooved collar 69 threaded on its lower end. A spring 72 normally urges the latch 68 upwardly into latching position. For releasing the latch, a wire or like flexible line 73, which is shown in phantom by a broken line in FIG. 1, is connected at opposite ends to the lower end of latch 68, and to a pivotal operating lever 74 that is mounted in the vehicle at any desirable point therein where it can be conveniently manipulated by the operator of the vehicle. Intermediate its ends wire 73 passes around guide rollers 77 and 77′, so that when the lever 74 is pivoted against the resistance of spring 72, the latch 68 is withdrawn from engagement with dog 70.

When door 59 is latched closed, the cams 65 engage flanges 75, which project laterally from opposite sides of the pod housing 41 along its lower side edges. When, however, the latch 68 is moved to its released position, the cover 59 is swung automatically upwardly by a pair of springs 76, each of which is connected at one end to the frame 21 adjacent the front of compartment 39, and at its opposite end to one of the hinge plates 61. This upward movement of the cover 59 and consequent rotation of the hinge plates 61 (for example, counterclockwise in FIG. 1) causes the links 64 to rotate the cams 65 about the shafts 66 so that the cams disengage the flanges 75 on the housing 41. This releases the pod 40 so that it may be removed from compartment 39.

To remove the pod 40 from compartment 39, and alternatively, to insert a pod 40 into the compartment, a power-operated tool 80 of the type illustrated in FIG. 5 may be employed. At its front tool 80 has a portion 81 that has a concave front face 82, which is complementary to the curved, convexedly shaped rear face of the wall 47 of pod 40. Adjacent its upper end projection 81 has two spaced identically shaped, hooks 83, that extend laterally outwardly and upwardly. The tool 80 is adapted to be mounted in a pod handling facility so that the tool is normally located below and behind the vehicle 20, when the latter is driven or otherwise moved into position for removing its pod. After the vehicle has been halted in place, the tool 80 is moved upwardly to a point where the tops of the hooks 83 are slightly below the level of the tops of the slots 56 (FIGS. 2 and 3) in the pod 40. Tool 80 then moves horizontally forwardly toward the vehicle until the hooks 83 push the cover plates 57 open against the resistance of their springs and enter the slots 56. The concave surface 82 of the tool is then in contact with the complementary rear surface of the wall 47 of the pod. The tool 80 then moves vertically a slight distance to lift the weight of the pod 40 from the bottom of the compartment 39. The tool 80 then moves horizontally rearwardly to withdraw the pod 40 from compartment 39, thereby disengaging the female receptacles 49 and 50 of the pod from the male terminals 51 and 52 at the front of compartment 39. The removed pod 40 is then conveyed away for servicing or recharging, and a new pod is installed in compartment 39 by the tool 80.

When a vehicle 20 is moved into operative relation with a facility of the type described above, it is possible to employ an external tool (not illustrated) for engaging and drawing the sleeve 69 downwardly against spring 72 automatically to release door 59 before the advance of tool 80 into engagement with the pod.

When a new pod has been installed in compartment 39, the door 59 may be closed manually by grasping the handle 58 and forcing the door downwardly into its latched position. Alternatively, a grapple (not illustrated) may be employed in conjunction with tool 80 automatically to close door 59 after compartment 39 has been loaded.

FIGS. 6 and 7 illustrate a power pod 40', which may be used alternatively or selectively with power pod 40 and which is intended to be employed for long distance driving. Pod 40' comprises a housing 41', which is substantially identical to the housing 41 for pod 40. Pod 40' contains a gasoline engine 85 and a self-excited direct current electric generator 86. Generator 86 is driven from the motor 85 in conventional manner by belts 88.

A governor 90 is connected by conventional linkage 92 to the carburetor 94 of the engine 85 in such manner as to control the speed of the engine and generator. Governor 90 is a conventional electro-mechanical unit having its input terminals connected across the output terminals of generator 86 so that the governor continuously measures the output voltage of the generator, and continuously changes the position of the throttle lever on carburetor 94 to maintain the output voltage of the generator at approximately constant value.

Housing 41' for pod 40' also contains a muffler 96 and tailpipe 97 which are connected to the engine 85 in the usual manner. Tailpipe 97 projects downwardly through an opening 98 in the bottom of housing 41', and is adapted to register with an exhaust and vent opening 100 (FIG. 1) in the bottom of compartment 39. Ducting 102 is provided in one side wall of pod 40', to admit and discharge cooling air into the housing 41'. A gasoline tank 104, which is mounted in the top of housing 41' is connected by a fuel line 105 to the carburetor 94. It has a fill pipe 106, which extends through an opening in the rear wall of housing 41'.

Although in the illustrated embodiments the door 59 seals compartment 39, it will be apparent that the door 59 may be provided with an opening which registers with vent 55 or fill pipe 106, if it is desired to extend these members to the exterior of the vehicle.

An electric starter motor 108 is mounted in housing 41' adjacent the engine 85, and is connected in a conventional manner by gearing and a flywheel 109 with the engine 85. An auxiliary battery 110 is provided to furnish power for starting the engine 85, and to furnish power for all accessories on the vehicle (headlights, horn, etc.) except the heater. A gasoline fuel measuring device 112 of an electrical nature is connected to the tank 104 to furnish information regarding the amount of fuel in the tank. As in the case of housing 41, housing 41' is provided with female receptacles 49' and 50' for connecting the D.C. power supply generated by pod 41' to the motor or motors 30, and the several electrically operated instruments in the vehicle. The curved rear end wall of housing 41' is provided with a spaced, parallel slots 56', similar to the slots 56 in housing 41, to permit lifting of the pod out of the vehicle and insertion of another pod.

Housing 41' also contains an electrical control unit 114 for controlling engine 85 and several of the vehicle's accessories. The function of unit 114 is illustrated more clearly in the schematic diagram of FIG. 7, which shows the unit 114 to be connected by conventional linkage 116 to the carburetor 94. When the engine 85 is started, the linkage 116 causes the carburetor throttle to be positioned temporarily at the best setting to assist starting.

Pod 40' is normally not tightly sealed like pod 40, but instead housing 41' may contain holes, cutaways, etc., as may be convenient.

Figure 8:
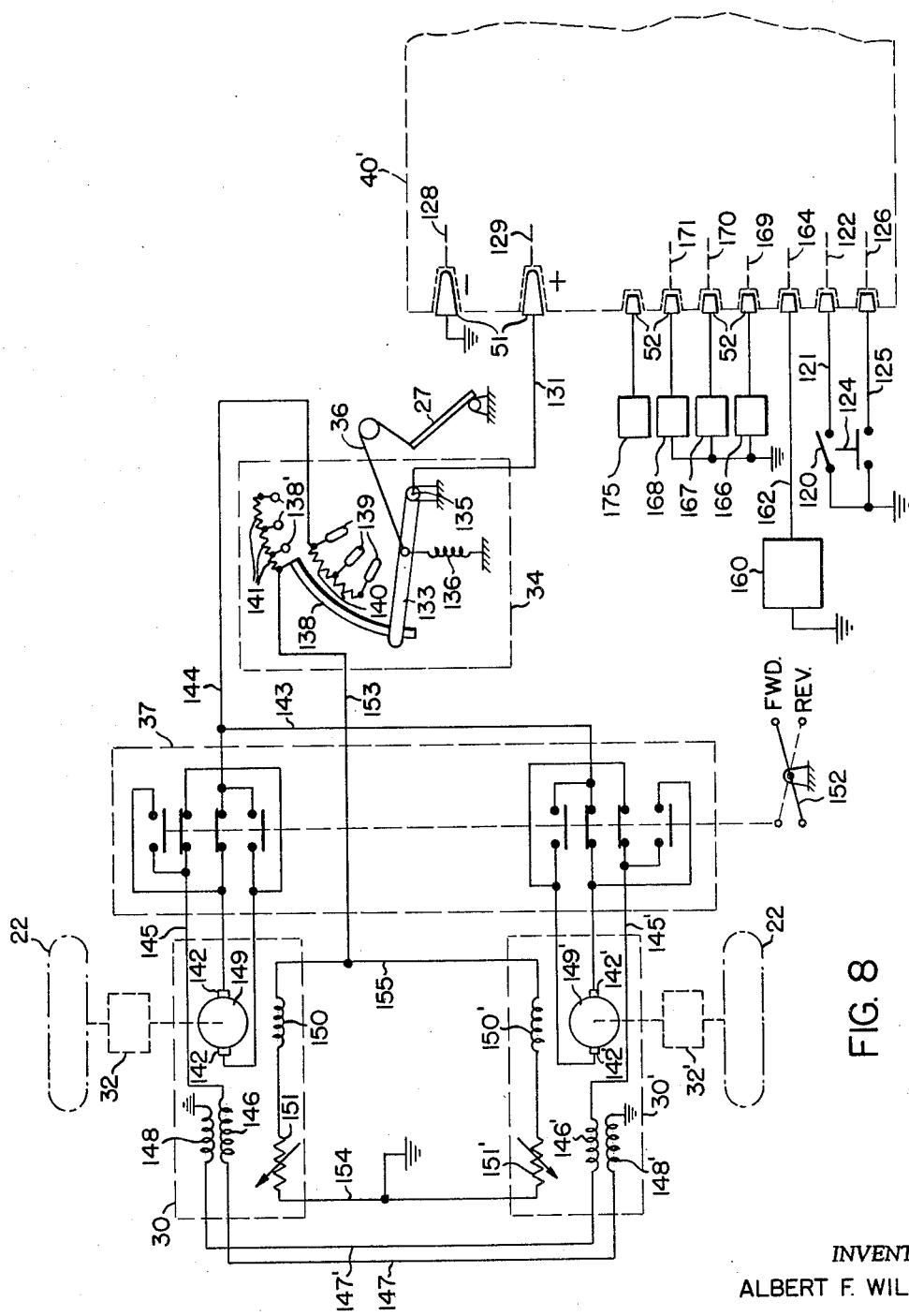
FIG. 8 is a wiring diagram illustrating schematically one type of automotive drive mechanism, and the controls therefore, which may be used on this vehicle, and which may be powered by either of these pods.

FIG. 8 illustrates schematically the control mechanism which is used for transmitting power from either pod 40 or 40', to the wheels of vehicle 20, and to its instruments. For purposes of description, the control mechanism of FIG. 8 will be described in conjunction with the use in the vehicle of a power pod of the type shown at 40' in FIGS. 6 and 7.

To commence the generation of power by the pod 40' the operator of the vehicle closes the ignition switch 120 (FIGS. 1 and 8) which may be mounted in a convenient position on the dashboard 28 of the vehicle. Switch 120 is connected at one side to ground, and at its opposite side, when closed, through line 121, and one pair of the now-interconnected terminals 52 and 50' with a line 122 (FIG. 7), and through the controller 114 to the battery 110. This supplies power to the ignition circuit in the controller 114. Then the operator momentarily presses and closes the starting switch 124 (FIGS. 1 and 8), which may be mounted on the dashboard in conventional manner to be accessible to the operator. Switch 124 is connected at one side to ground and at its opposite side through a wire 125, another now-connected pair of terminals 52 and 50' (FIG. 7), a wire 126, and the controller 114 to the battery 110. This energizes the starter 108, and causes the carburetor throttle to be moved through the linkage 116. This starts the gasoline engine 85, and in turn the generator 86, which supplies power for the motor (or motors) 30, through the lines 128 and 129 (FIG. 7), and the pair of receptacles 49' to the pair of jacks 51, which project rearwardly in compartment 39.

One of these jacks 51 (FIG. 8) is connected to ground, and the other is connected through a wire 131 with a contact arm 133, which is mounted in the controller 34 to pivot at its lower end about a stationary pin 135 into and out of a "Power Off" position (FIG. 8) in which it is normally held by a spring 136. When the accelerator 27 (FIG. 1) is depressed, the linkage 36 pivots the arm 133 out of its "Power Off" position, and successively into engagement with an elongate, arcuate contact 138, spaced contacts 139, and then spaced contacts 138'. The contacts 139 are separated by series connected resistors 140, and the contacts 138 and 138' are separated by series connected resistors 141.

For purposes of discussion, it will be assumed that vehicle 20 has two front wheels 22 that are separately driven, respectively, by two direct current motors 30 and 30' (FIG. 8), and associated gear drive units 32, 32'. Each motor 30, 30' has an armature 149, 149', a pair of brushes 142, 142', series field coils 146, 146', and shunt field coils 150, 150'. Also arranged in the motors are second sets of field coils 148, 148' which are so connected between the two motors 30, 30' as to provide for cumulative compounding fields automatically to compensate, because of such cross-connection, for any unbalanced loading conditions on the motors when the vehicle is turning a corner. Shunt field coils 150, 150' are, respectively, serially connected to field-balancing rheostats 151, 151'. This is known structure.

Coils 146, 146' connect at one end, respectively, to lines 145, 145'. At their opposite ends coils 146, 146' are connected to ground through wires 147, 147' and series field coils 148', 148, respectively. The resistors 151 and 151' are connected to a grounded line 154; and the coils 150 and 150' are connected through lines 155 and 153 to the contacts 138 and 138' of the controller 34.

Switch 37 controls the forward and reverse motions of the vehicle 20, and is manipulated by its handle 152 (FIGS. 1 and 8), which is mounted at a convenient spot on the dashboard 28. When handle 152 is in forward position, one brush 142, 142' of the motors 30 and 30' is directly connected through the switch 37 and the wires 143, 144 to the contacts 139. When the switch handle 152 is moved to its reverse position, the other brush 142, 142' in each motor is connected through the switch 37 and the wires 143 and 144 with the contacts 139.

When the operator wishes to put the vehicle in motion, he first energizes the engine 85, if he is using the pod 41' (FIGS. 6 and 7), then he puts the switch handle 152 in either "Forward" or "Reverse."

With the contactor arm 133 in its "Power Off" position, current flows through contact 138, and wires 153, 155 to the shunt field windings 150, 150', but no rotational power is being created by motors 30, 30', since the armature circuit is open, because the contactor 133 is not engaged with any of the contacts 139. When the operator depresses the accelerator 27, contactor 133 swings (clockwise in FIG. 8) into engagement with the first of the series connected contacts 139, thereby closing the armature circuits and armature current starts to flow in armatures 149, 149', in series fields 146, 146' through the limiting series connected resistors 140 and lines 143, 144. The motors 30, 30' thus start to develop the firm torque characteristics necessary for starting the vehicle under load, and the vehicle begins to move. To increase speed, the operator presses the accelerator 27 down further, which causes the wiper 133 to move further clockwise, thereby shifting from one contact 139 to another in a clockwise direction. This reduces the amount of series resistance in the armature circuits, and develops progressively increasing torque and progressively increasing speed.

When the wiper 133 reaches the position in which the resistors 140 are no longer in the armature circuit, the motors 30 and 30' operate primarily as series motors connected directly across the line voltage as supplied by the power pod 40', limited only by the small current which flows in the shunt field coils 150 and 150' to insure stability of the system in the event that wheels 22 begin to slip, as for example, on an icy surface. As the wiper 133 continues to be rotated by the accelerator 27, and into engagement with the contacts 138', that are disposed between the series connected resistors 141, the speed of the vehicle is increased further.

When the operator releases the accelerator 27, the spring 136 returns wiper 133 to its "Power Off" position.

The electrically powered accessories of the vehicle 20, such as head lights, radio, cigarette lighter, etc. are represented in block form in FIG. 8 at 160. These accessories are connected through a line 162 and a jack 52 in compartment 39 either with a receptacle 50' and line 164 to the controller 114 (FIG. 7), if the pod 40' is mounted in the compartment 39, or with a receptacle 50 and line 165 to the battery 53, if the pod 40 is mounted in compartment 39. Therefore, regardless of the type of pod 40 or 40' disposed in compartment 39, the standard vehicle accessories are powered through the same jack 50.

Conventional electrically-powered indicators (for example, lamps or meters) 166, 167 and 168 for temperature, oil pressure and gas level, respectively, which are mounted on the dashboard 28, are shown schematically in FIG. 8 to be connected through cooperating jacks 52 and 50', and the wires 169, 170 and 171 (FIG. 7), respectively, with their respective gauges 172, 173 and 112. Also, power for recharging auxiliary battery 110 in pod 40' is supplied from generator 86 through line 174 to the controller 114.

An additional jack 52 projects from compartment 39 for insertion into a further receptacle 50 in the pod 40, which is connected to the monitoring device 54 (FIG. 3) for pod 40, thereby to connect the device 54 automatically to a conventional gauge 175 on the dash 28, when a pod 40 is inserted into compartment 39.

When using pod 40, those indicators associated with gasoline engine operation such as 166, 167, 168 on dashboard 28 are inoperative. Conversely when using pod 40' the indicator 175 such as 166, 167, 168 operate but the indicator connected to battery monitoring device 54 is inoperative.

The front wall of each pod 40 is provided with sufficient recesses to accommodate the several jacks 52 which project from the rear of compartment 39 to service the ignition circuits and the gasoline, temperature and oil pressure gauges that are used only when a pod 40' is housed in compartment 30.

In another form of this invention, two or more power pods may optionally be used in a single vehicle. By using two or more power pods better load balance and performance, particularly in a large vehicle, may be achieved, and also space may be utilized more efficiently and more esthetically, and a high degree of flexibility in possible power pod utilization configuration may be attained to increase vehicle utility under varying conditions.

Figure 9:
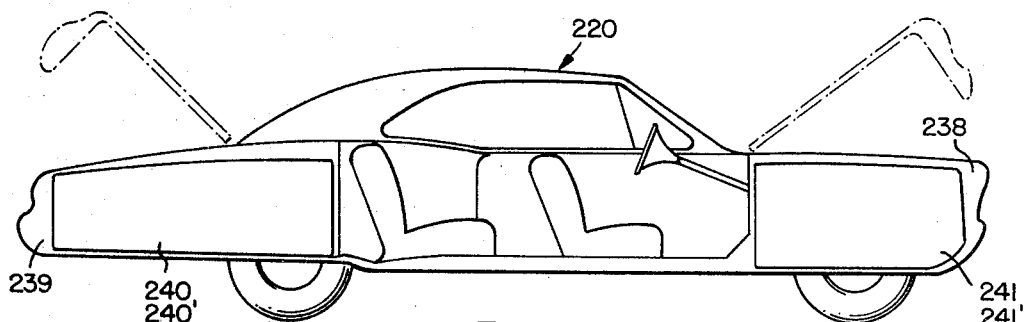
FIG. 9 illustrates schematically a vehicle on which both types of power pods may be mounted simultaneously.
Figure 2:
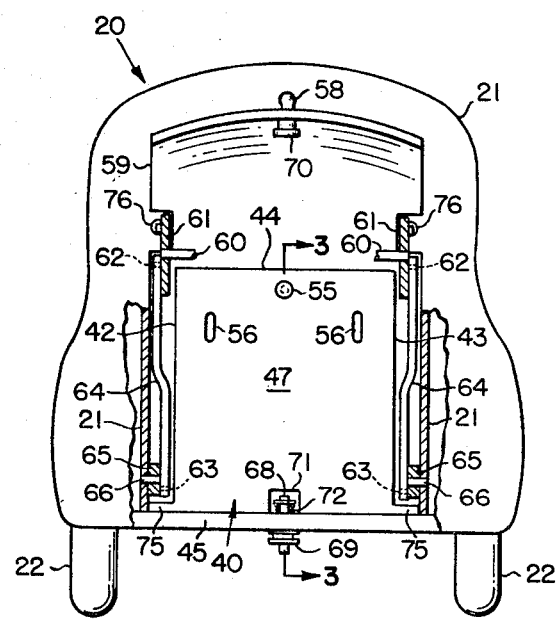
FIG. 2 is a rear view of this vehicle, parts thereof again being cut away to show this power pod.

FIGURE 9 illustrates a conventional-appearing automotive vehicle 220, which uses electric drive techniques as described earlier. This vehicle contains two electric power pod compartments 238 and 239 in its forward and rear ends, respectively. Either of these may be used alternatively as luggage space when not occupied by a power pod.

Both of these power pod compartments may be provided with the electrical jacks, pod locking mechanisms and door latches of the type disclosed above. Also, either compartment may hold optionally both types of power pods described above, that is, compartment 239 may hold a battery power pod 240 having the same parts and functions as a battery power pod 40, or a mechanical power pod 240' having the same parts and functions as power pod 40'. Power pods 240 and 240' are mechanically and electrically interchangeable in same manner as power pods 40 and 40'. Likewise either type power pods may be inserted and used in power pod compartments 238.

For convenience in packaging, it may be desirable to configure the power pods in accordance with the compartments in which they are to be used. On this basis there would be four power pod types: rear battery power pod 240, rear mechanical power pod 240', forward battery power pod 241, and forward mechanical power pod 241'. Vehicle 220 may be operated with any one of these four available power pod types or combinations of two. For city driving the battery-powered pods only will be used, and for country driving the generator-powered pods preferably will be used or one of each may be used together.

The combination shown in FIG. 9 allows a motorist, beginning a trip in an urban area and carrying one of each type of power pod to drive initially on battery power only. He need not initially start the gasoline engine in the generator-type pod. As he leaves the urban area, however, and when air-pollution and noise restrictions are lifted, he can start the gasoline engine. Since the generator operates at a higher voltage output than the battery-power pod output voltage, the generator-type pod will immediately assume all load demands of the vehicle, except for starting or climbing hills, and will additionally recharge the battery pod which is now floating on the line. Entering a new urban area, the driver stops his generator pod and operates from the battery pod only. Conventional electrical control and cutout means (not shown) may be used to prevent overcharging of the battery or reversed polarity.

From the foregoing it will be apparent that applicant has developed a novel electrically operated vehicle, which may be powered selectively by one of two novel power pods of the battery and generator type, respectively, or, alternatively may be powered by a combination of these pods. The novel pods disclosed herein may be rapidly and automatically inserted into or withdrawn from a vehicle, and include cooperating male and female type electrical connectors (for example, bayonet-type connectors) which automatically become connected to, or disconnected from, one another as a pod is inserted or removed from a vehicle. The vehicle is designed so that preparation thereof for pod substitution may be performed by the driver of the vehicle, by personnel in a facility for changing pods, or by automatic equipment maintained in such facility.

An individual may purchase with his vehicle a complement of power pods and shift at will the battery operated power pods so as to have one recharging while another is operating. Of course he need only own one generator type pod because all he needs for such a pod is to replenish its gasoline supply periodically. On the other hand, present gasoline stations may stock power pods, and all a motorist need do then is to drive into a station, have a battery-operated power pod lifted out, and another such pod substituted. The female connections in the power pods and the cooperating male connections on the vehicle permit disconnection of a pod from the car and substitution of another pod therefor, a simple matter of a few seconds. Power-pod service organizations also may be established to offer power pod services to motorists generally.

In the simplest form of this invention, only battery power pods are used. Replacement of any discharged battery power pod may be effected easily. Battery charge monitor 54 continuously advises the driver of the charge in the battery, and when needed, the motorist drives to one or more conveniently located power-pod replacement stations and has the pods changed. This invention obviates need for any vehicle owner to lay up his vehicle while the battery is being recharged.

A further advantage of my invention lies in the use of two distinct types of power pods; one in which a battery is used to furnish energy, and the other in which mechanical energy of some type is converted into electrical energy through a generator.

The generator type power pod, as stated above, operates at higher design voltages than do the battery power pods. By the simple provision of means for selectively using these two different voltages, the vehicle may be automatically caused to have two significantly different operating characteristics, each ideal for different driving conditions, a battery pod for urban driving where non-polluting of air and lower noise generation are desired, and where there are lower speed restrictions, and a generator type pod for non-urban driving where air pollutino is a minor factor and the principal factors are speed and continued operation of the vehicle for relatively long periods of time and over relatively long distances. Besides these considerations, it is desirable in the cities to limit the speed of the vehicle, when carrying the heavy battery pod, to limit wear on braking systems. Motors 30 and 30′ and control 34 will function principally in the series motor mode, at the lower voltage, with no sacrifice in starting torque or speed responsiveness, since the low voltage of the battery power pod is strongly supported by the powerful current furnishing ability of the battery. Conversely, operating the generator-type power pod at its higher design voltage will permit higher speeds in the non-urban driving conditions, for which such a pod is principally advantageous. With the lighter generator type pod, high speeds are most efficiently attained by operating motors 30, 30′, once vehicle has started and accelerated, primarily as shunt motors. Operating the generator type pod as its higher design voltage facilitates the use also of the generator type pod to recharge the battery power pod in certain multi-pod configurations, such as the type shown in FIG. 9.

While the generator of the generator type power pod has been described as driven by a gasoline engine it is obvious that the prime mover may instead be operated by diesel fuel, or a turbine using gasoline or steam, magneto-hydrodynamic devices, etc.

It is further to be understood that while the connections between the pods and the electrical circuit of the vehicle have been described as male and female couplings, it will be understood that various connector techniques may be employed for this purpose as will be obvious to those skilled in the art. Furthermore, the hold down means for the pods may be of various types. They can be manually-operated wrench means or can be operated by the driver mechanically, electrically, hydraulically or pneumatically. Likewise, the doors of the pod compartments can be electrically-operated, spring-operated, etc. Still further it is to be understood that the term "battery" is herein used in the broad sense of a device that creates electrical energy by chemical change. Thus it includes fuel cells. Moreover, it is to be understood, that in its broadest sense, this invention anticipates the use of alternating current power supplies in pods 40 and 40′; and it is not intended to limit this invention solely to direct current power supplies.

It is further to be understood that the power pod compartments illustrated in the FIGURES 1 through 9 as located at the rear and forward ends of the vehicles may be located in any convenient part of the vehicles, such as under the floor, under the seats, in the roof, in one side etc.; and further that access doors 59 may be located to provide access to such compartments from any direction such as from the top, the bottom, either side etc. and two or more doors may be provided for each compartment so that simultaneous insertion of a new pod and removal of an old pod may be effected in a straight-through manner, or other; and further that power pod compartments 39, 239, 238 may be of any convenient shape to provide the needed volume and to utilize otherwise unusable space. For simplicity of illustration and description only one type of tool 80 is illustrated, but numerous other means of removing power pods and reinserting power pods such as conveyors, fork-lift trucks etc. may be provided as may be more convenient for the shape, weight etc. of various power pods utilized, as is well understood by those skilled in the materials-handling and automation arts.

I claim:
1. An electrically-powered vehicle comprising
a body having a compartment therein open at one side,
an electrical motor for driving said vehicle,
a pod removably mounted in said compartment and having therein an electrical power supply,
means for coupling said motor to said power supply to drive said vehicle,
said coupling means including cooperating electrical coupling elements in said compartment and said pod, respectively, releasably connectable to one another, when said pod is properly seated in said compartment, and which are disconnectable from one another when said pod is removed from said compartment,
a cover mounted on said body for limited movement into and out of a closed position in which it closes the opening in said one side of said compartment,
movable cam means mounted on said compartment for releasably engaging and securing said pod against movement in said compartment, and
means connecting said cover to said cam means, and responsive to the movement of said cover automatically to operate said cam means, thereby to secure said pod in said compartment, when said cover is moved to its closed position, and to release said pod for removal from said compartment, when said cover is opened.

2. A power package for use with electrically powered vehicles of the type having a compartment open at one side, and having electrical coupling elements projecting from another side thereof, comprising
a pod having in one wall a plurality of electrical sockets for receiving said electrical coupling elements, when the pod is inserted into said compartment, and
an electrical power supply in said pod having a voltage output applied to at least two of said sockets,
another wall of said pod having a pair of spaced openings and a convexedly shaped external surface for cooperation with a tool that is used for inserting the pod into, and withdrawing it from, said compartment.

3. A power package as defined in claim 2, wherein said power supply comprises a battery in said pod.

4. A power package as defined in claim 2 wherein said power supply in said pod comprises an electrical generator, and an internal combustion engine for driving said generator.

5. The combination with an electrically-powered vehicle having
an electric motor for driving it,
and a compartment having therein one of a pair of electric coupling members, said one member being connected in circuit with said motor, of a pair of power pods selectively mountable in said compartment, each of said pods having means thereon for releasably onnecting the pod with a tool that is used for inserting the pods into, and withdrawing them from, said compartment, each of said pods having therein an electric coupling member automatically couplable to said one coupling member upon the insertion of the pod into said compartment, and constituting the other member of said coupling pair to supply power from the pod in said compartment to said motor, one of said pods containing an electric battery for supplying the power necessary to operate said vehicle, when said one pod is in said compartment, and the other of said pods containing an electrical generator and an internal combustion engine for driving said generator, the output of said generator being connected to the coupling member in said other pod to supply the power necessary to operate said vehicle, when said other pod is in said compartment.

6. A power package for use with electrically-powered vehicles of the type having a compartment open at one side, and having first electrical coupling elements in another side thereof, comprising a pod having in one wall second electrical coupling elements registerable with said first electrical coupling elements, when the pod is inserted into said compartment, and an electrical power supply in said pod having a voltage output applied to at least two of said second elements in said pod, another wall of said pod having tool engaging means thereon for releasably securing the pod in engagement with a tool that is used for inserting said pod into, and withdrawing it from, said compartment, and certain of said first and second elements, respectively, being projections, and the other of said first and second elements being sockets for releasably receiving said projections.

References Cited
UNITED STATES PATENTS

| | | | |
|---|---|---|---|
| 667,189 | 2/1901 | Condict | 180—65 |
| 668,359 | 2/1901 | Stevens | 180—65 |
| 1,111,510 | 9/1914 | Ward | 180—65 |
| 1,138,122 | 5/1915 | Lambert et al. | 180—68.5 |
| 1,165,784 | 12/1915 | Klingelsmith | 180—68.5 |
| 1,527,431 | 2/1925 | Gumpper | 180—65 XR |
| 2,823,621 | 2/1958 | Arnot | 180—65 XR |
| 3,205,966 | 9/1965 | Landers | 180—65 |

LEO FRIAGLIA, Primary Examiner

MILTON L. SMITH, Assistant Examiner

U.S. Cl. X.R.

180—68.5